Patented June 28, 1932                                                    1,865,123

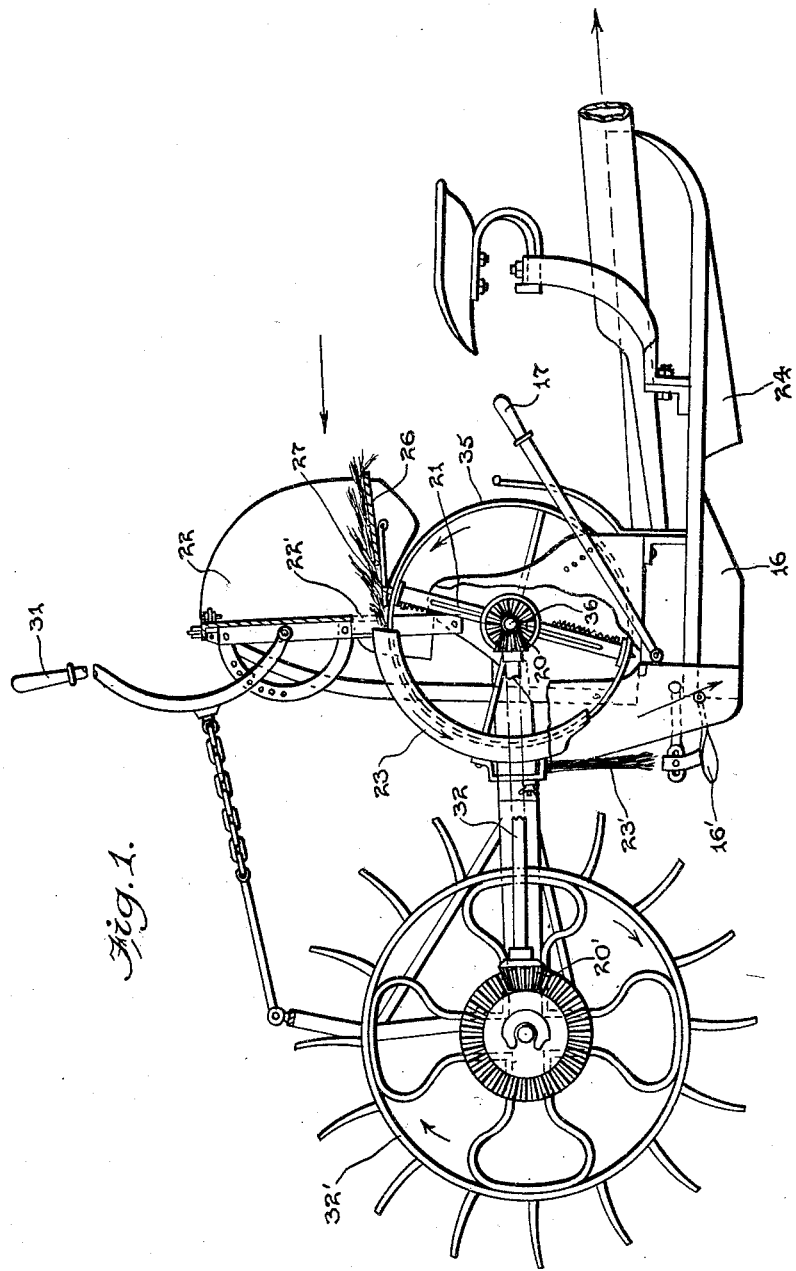

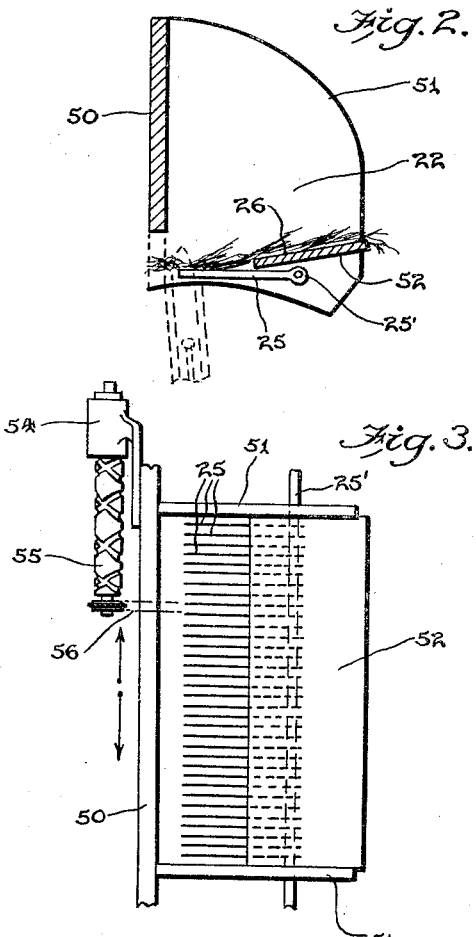

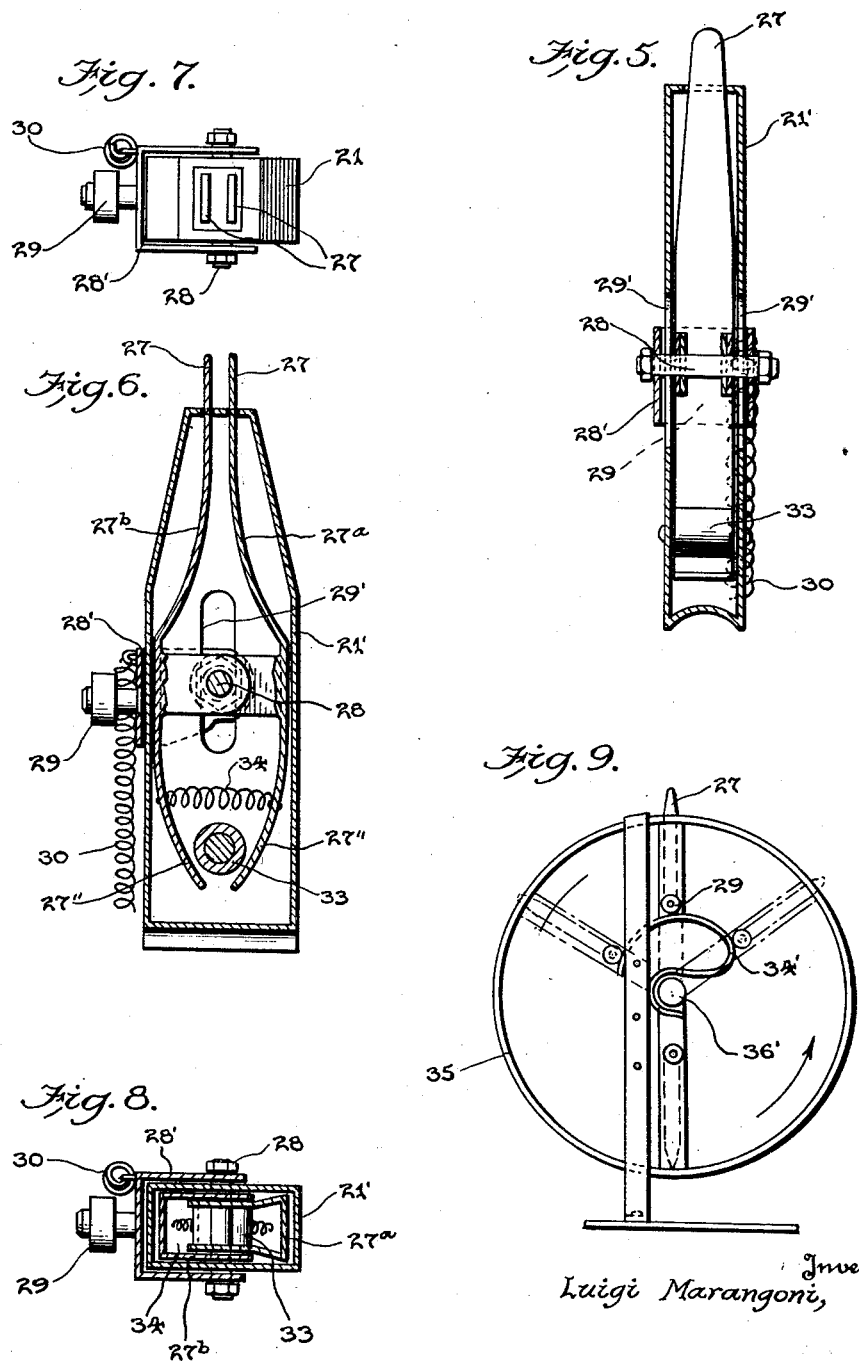

UNITED STATES PATENT OFFICE

LUIGI MARANGONI, OF PAVIA, ITALY

MACHINE FOR TRANSPLANTING EDIBLE GRAIN PLANTS

Application filed March 19, 1928, Serial No. 262,893, and in Italy March 18, 1927.

It is known that machines used heretofore for transplanting cereal plants have the disadvantages that they dispose the plants too far apart from one another, and that those which have sought to remedy this drawback involve too complicated and delicate mechanisms.

The improvements comprising the present invention tend to overcome the aforementioned objections by arranging the plants in the same row at short distances apart, as other transplanting machines do, but with the rows themselves closer together, so that the number of plants distributed over a certain area of ground is sufficient to produce a good crop.

The improved machine is characterized in that the operation of its component devices imitates the movements followed in hand planting. It comprises, in combination, shares for cutting furrows in the ground, and a rotating unitary device driven by means of a suitable transmission from the driving wheel of the machine; such device being equipped with means for picking the plants from the storage receptacle containing them, and for transporting them into proper position in the furrow where they are covered by special shares arranged in accordance with the spaces between the first-mentioned shares. Various accessory devices are also provided to cooperate with the above and will be more fully described later on.

In the accompanying drawings:

Figure 1 is a diagrammatic side view of the complete machine according to the invention;

Figs. 2 and 3 show, in cross-section and fragmental plan view, respectively, the storage receptacle with the grating for distributing the plants to be transplanted to the pickers;

Fig. 4 is a front view of the main shaft of the machine with some of the setting wheels mounted thereon in different positions, in order to show the pickers more or less retracted.

Figs. 5 and 6 are detail views of the picker, which is shown in vertical sections at right angles to each other;

Fig. 7 is an end view of the picker.

Fig. 8 is a transverse section of said picker.

Fig. 9 is a diagrammatic view of the driving mechanism for the pickers.

Referring more particularly to said drawings, 35 indicates a wheel mounted, with a plurality of similar wheels (see Fig. 4), on a shaft 36 rotated by gearing 20 from a longitudinal shaft 32 which is itself operated by the main driving wheel 32' of the machine through gearing 20'. Suitable devices, as a lever system operated by handle 31, serve for raising the driving wheel when the machine is not running.

The wheels 35 are provided with hollow arms 21, arranged diametrically opposite each other, wherein the picking means for the transport of the plants are disposed. Suitably mounted and supported on the frame at the upper part of the machine and above said wheels, there is a receptacle 22 wherein the plants to be transplanted are periodically laid by an operative or operatives riding on the machine.

The plants 26 are removed from said receptacle 22 during the rotation of the wheels by devices 27 adapted to pick up the plants and to transport them into a wide channel or trough 23 which encloses or embraces a portion of the periphery of the wheel 35 and the bottom of which is formed by the rim of said wheel. When the plant has been moved far enough into the channel, the picker 27 is caused to open and the plant falls down into the furrow, guided by said channel.

The furrows are cut by means of shares 16 which open the ground with the cooperation of colters 24. The root of the plant which has fallen in the furrow is covered over with earth by the furrow closers 16' controlled vertically by means of a lever 17 suitably connected with them.

The receptacle 22 comprises a vertical rear wall 50, a pair of side or end walls 51, and a bottom wall 52, which latter does not extend as far as the rear wall 50 but its rear part is formed by a series of steel blades 25 set on edge and constituting a grating. These blades 25 are not fastened to the vertical rear wall 50 of the receptacle but are left free at that point and hinged to the bottom of said receptacle, so that the grill or grating as a whole can be rocked about the hinge pin 25′ which is mounted in bearings beneath the bottom wall 52. Suitable means at the end of the pin 25′ are provided so as to raise the grill more or less above the pickers, as shown in dotted lines in Fig. 2, (and see also Fig. 1), whereby one or more plants 26 disposed on said grill are picked up by the pickers.

A sleeve 54 (Fig. 3), bolted at 53 on the rear wall 50 and engaged by a double-threaded screw 55, serves to reciprocate the receptacle 22 horizontally so as to displace it alternately for a distance equal to the distance between two contiguous wheels 35 (see Fig. 4). The screw 55 is actuated by a chain 56 driven from shaft 36 (not represented in Fig. 3). Thus the plants disposed in the receptacle 22 are, on account of its motion, caught ordinarily layer by layer.

The pickers comprise each a pair of coacting jaws or members $27_a$, $27_b$ (see Figs. 5, 6, 7, 8) disposed in a casing 21′, fixed diametrically on the wheel 35. The projecting ends 27 of the jaws serve to catch the plants from the receptacle 22 and carry them along the channel 23; said projecting ends not being rigid but somewhat elastic so as not to bruise the plants when picking them up.

The jaws $27_a$, $27_b$ are mounted to swing or rock about a pivot 28 fixed at its ends to a stirrup member 28′ that slides along the casing 21′ and carries an external roller 29 for controlling the longitudinal movements of the picker. Elongated slots 29′ are formed in the opposite walls of the casing so as to permit the stroke of the pivot 28. When said pivot, through the associated stirrup 28′ and roller 29, is raised, the jaws first emerge from the box and then the inner ends 27″ of the jaws are pressed against a fixed spindle 33, whereby said jaws are caused to close at 27; a tension spring 34 serving to hold the picker normally open in the position shown.

The casings 21′ are suitably fixed on the wheels 35, or they may be replaced by hollow arms 21, as stated above. A guide 34′, bolted in proper position with respect to the wheel 35 on the frame of the machine (see Fig. 9), engages the roller 29 when the jaws are in proximity to the receptacle 22, thus forcing the roller to rise and the jaws to project between the blades of the grill 25 into the receptacle. The continuation of the movement causes the ends 27″ to press against the spindle 33, and the picker is thereby closed on any plants which are caught in the receptacle and transported into the channel 23 (as represented in Fig. 2). The quantity of plants thus caught by the picker depends upon the more or less raised position of the grill.

When the roller 29 reaches the end of the guide 34′, it is forced to move in the opposite direction towards the shaft 36 by a spring 30 connected at one end to the stirrup 28′ and at the other end to the wheel 35. The stirrup 28′ is lowered and the jaws are opened by the spring 34 when the ends 27″ are free from the spindle 33.

The plant transported by said jaws falls down through the lower end of the channel 23 where flexible means, as for example a brush 23′ with flexible bristles, serves to guide the plants into the furrow, said flexible means being adapted to pass over said plants without overturning or injuring them. Fig. 4 shows the jaws in various positions. The furrows cut in the ground by the colters 24 and opened by the shares 16 receive the plants and are subsequently closed by the furrow closers 16′.

The number of rows of plants will depend upon the number of elements 35 mounted on the main shaft 36 of the machine and upon the diameter of the wheel 35, the number of revolutions of said wheel, and the number of picker-carrying arms.

It will be understood that various changes in the form, proportion, size and minor details of construction, may be resorted to without departing from the spirit of the invention.

I claim as my invention:—

1. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, a number of movable pickers carried by said plant-setting means; each comprising a box fixed to said plant-setting means, a stirrup mounted to slide along said box, a pair of jaws pivotally mounted on said stirrup, a spring connecting said jaws and adapted to open them, a spindle fixed on said box and adapted to close said jaws so that the latter close, in advancing, and pick up a number of plants from said receptacle and transport them to the furrow opened by said furrow opener; means adapted to guide said plants during their transport, means operatively connected with said shaft for reciprocating said receptacle, and means for regulating the quantity of plants picked up by said pickers.

2. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, a number of movable pickers carried by said plant-setting means; each comprising a box fixed to said plant-setting means, a stirrup mounted to slide along said box, a pair of jaws pivotally mounted on said stirrup, a roller rotatably journalled on said stirrup, a cam cooperative with said roller for advancing the stirrup, a spring to return said stirrup, a second spring connecting said jaws and adapted to open them, a spindle fixed on said box and adapted to close said jaws when pushed out by said cam so that said jaws when pushed out by said cam, close and pick up a number of plants from the receptacle and transport them to the furrow opened by said furrow opener, means for guiding said plants during their transport, means operatively connected with said shaft for reciprocating said receptacle, and means for regulating the quantity of plants picked up by said pickers.

3. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, pickers carried by said plant-setting means and for picking up a number of plants from said receptacle and transporting them to the furrow opened by said furrow opener, means for guiding said plants during their transport, a grating mounted on the bottom of the receptacle for supporting the plants so as to permit said pickers to pick them up, means for raising and lowering said grating upon said pickers, so that the latter pick up one or more plants, and means operatively connected with said shaft for reciprocating said receptacle.

4. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, means carried by said plant-setting means for picking up a number of plants from said receptacle and transporting them to the furrow opened by said furrow opener, means for guiding said plants during their transport, a grating hinged on the bottom of the receptacle for supporting the plants so as to permit said pickers to pick them up, a rotatable hinge pin for raising and lowering said grating upon said pickers so that the latter pick up one or more plants, and means operatively connected with said shaft for reciprocating said receptacle.

5. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, pickers carried by said plant-setting means for picking up a number of plants from said receptacle and transporting them to the furrow opened by said furrow opener, means for guiding said plants during their transport, means for regulating the quantity of plants picked up by said pickers, a sleeve fixed to said receptacle, and a screw having right and left threads operatively connected with said shaft and engaging said sleeve to reciprocate said receptacle so that each portion of said receptacle may pass successively over said plant-setting means.

6. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, a number of movable pickers carried by said plant-setting means; each comprising a box fixed to said plant-setting means, a stirrup mounted to slide along the box, a pair of jaws pivotally mounted on said stirrup, a spring connecting said jaws and adapted to open them, a spindle fixed in said box and adapted to close said jaws so that the latter, in advancing, close and pick up a number of plants from the receptacle and transport them to the furrow opened by said furrow opener, a channel leading from the said receptacle towards the furrow and shaped so as to embrace the rotary plant-setting means and guide the plants transported by the same, flexible means attached to said channel and constituting a continuation thereof, means operatively connected with said shaft for reciprocating said receptacle, and means for regulating the quantity of plants picked up by said pickers.

7. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, pickers carried by said plant-setting means for picking up a number of plants from the receptacle and transporting them to the furrow opened by said furrow opener, a channel leading from the said receptacle towards the furrow and shaped so as to embrace said rotary plant-setting means and to guide the plants transported by said pickers, a brush with flexible bristles fixed to said channel and constituting a continuation thereof, a grating mounted on the bottom of said receptacle for supporting the plants so as to permit said pickers to pick them up, means for raising and lowering said grating upon said pickers so that the latter may pick up one or more plants, and means operatively connected with said shaft for reciprocating said receptacle.

8. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, a number of movable pickers carried by said plant-setting means; each picker comprising a box fixed to said plant-setting means, a stirrup mounted to slide along said box, a pair of jaws pivotally mounted on said stirrup, a roller rotatably journalled on said stirrup, a cam cooperative with said roller for advancing the stirrup, a spring to restore said stirrup, a second spring connecting said jaws and adapted to open them, a spindle fixed on said box and adapted to close said jaws when pushed out by said cam so that said jaws, when pushed out by said cam, close and pick up a number of plants from the receptacle and transport them to the furrow opened by said furrow opener, a channel leading from the said receptacle towards the furrow and shaped so as to embrace said rotary plant-setting means and to guide the plants transported by said means, flexible means fastened to said channel and constituting a continuation thereof, means operatively connected with said shaft for reciprocating the receptacle, and means for regulating the quantity of plants picked up by said pickers.

9. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, a number of movable pickers carried by said plant-setting means; each picker comprising in combination a box fixed to said plant-setting means, a stirrup mounted to slide along said box, a pair of jaws pivotally mounted on the stirrup, a spring connecting said jaws and adapted to open them, a spindle fixed on said box and adapted to close said jaws so that the latter, in advancing, close and pick up a number of plants from the receptacle and transport them to the furrow opened by said furrow opener, a channel leading from said receptacle towards the furrow and shaped so as to embrace said rotary plant-setting means and to guide the plants transported by said pickers, a brush with flexible bristles fixed to said channel and constituting a continuation of it, a grating mounted on the bottom of said plant receptacle for supporting the plants so as to permit said pickers to pick them up, means for raising and lowering said grating upon the pickers so that said pickers may pick up one or more plants, a sleeve fixed to said receptacle, and a screw having right and left threads operatively connected with said shaft and engaging said sleeve to reciprocate said receptacle so that each portion of said receptacle may pass successively over said plant-setting means.

10. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, pickers carried by said plant-setting means and adapted to pick up a number of plants from the receptacle and to transport them to the furrow opened by said furrow opener, a channel leading from the said receptacle towards the furrow and shaped so as to embrace said rotary plant-setting means and to guide the plants transported by said means, a brush with flexible bristles fixed to said channel and constituting a continuation thereof, a grating mounted on the bottom of said receptacle for supporting the plants so as to permit said pickers to pick them up, means for raising and lowering said grating upon said pickers so that said pickers may pick up one or more plants, and means operatively connected with said shaft for reciprocating said receptacle.

11. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, a number of movable pickers carried by said plant-setting means; each picker comprising a box fixed to said plant-setting means, a stirrup mounted to slide along said box, a pair of jaws pivotally mounted on said stirrup, a spring connecting said jaws and adapted to open them, a spindle fixed on said box and adapted to close said jaws so that the latter, in advancing, close and pick up a number of plants from the receptacle and transport them to the furrow opened by said furrow opener, a channel leading from the said receptacle towards said furrow and shaped so as to embrace said rotary plant-setting means and to guide the plants transported by said pickers, flexible means fastened to said channel and constituting a continuation thereof, a grating mounted on the bottom of said plant receptacle for supporting the plants so as to permit said pickers to pick them up, means for raising and lowering said grating upon said pickers so that the latter may pick up one or more plants, and means operatively connected with said shaft for reciprocating said receptacle.

12. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, a number of movable pickers carried by said plant-setting means; each picker comprising a box fixed to said plant-setting means, a stirrup mounted to slide along said box, a pair of jaws pivotally mounted on said stirrup, a spring connecting said jaws and adapted to open them, a spindle fixed in said box and adapted to close said jaws so that said jaws, in advancing, close and pick up a number of plants from the receptacle and transport them to the furrow opened by the opener, a channel leading from said receptacle towards the furrow and shaped so as to embrace said rotary plant-setting means and to guide the plants transported by said pickers, flexible means fastened to said channel and constituting a continuation thereof, means for regulating the quantity of plants picked up by said pickers, a sleeve fixed to the plant receptacle, and a screw having right and left threads operatively connected with said shaft and engaging said sleeve to reciprocate said receptacle so that each portion of said receptacle may pass successively over said plant-setting means.

13. In a transplanting machine comprising a driving wheel, a furrow opener, a furrow closer, a plant receptacle, and a transverse shaft adapted to be driven by said driving wheel; the combination of a plurality of plant-setting means on the above-mentioned shaft, pickers carried by said plant-setting means for picking up a number of plants from the receptacle and transporting them to the furrow opened by said furrow opener, a channel leading from said receptacle towards the furrow and shaped so as to embrace said rotary plant-setting means and to guide the plants transported by said pickers, flexible means fastened to said channel and constituting a continuation thereof, a grating mounted on the bottom of said plant receptacle for supporting the plants so as to permit the pickers to pick them up, means for raising and lowering said grating upon said pickers so that the latter may pick up one or more plants, a sleeve fixed to said receptacle, and a screw having right and left threads operatively connected with said shaft and engaging said sleeve to reciprocate said receptacle so that each portion of said receptacle may pass successively over said plant-setting means.

14. In a transplanting machine comprising a driving wheel, a furrow opener, a furrow closer, a plant receptacle, and a transverse shaft adapted to be driven by said driving wheel; the combination of a plurality of plant-setting wheels on the above-mentioned shaft, a number of movable pickers carried by said plant-setting wheels; each picker comprising a box, a stirrup, a pair of jaws pivotally mounted on said stirrup, a spring connecting said jaws, a spindle fixed in said box, a roller rotatably mounted on said stirrup, a cam cooperative with said roller for advancing the stirrup, a spring for restoring said stirrup, a spindle fixed in said box and adapted to close said jaws when pushed out by said cam, a channel leading from said receptacle towards the furrow and shaped so as to embrace the plant-setting means, a brush with flexible bristles fixed to said channel, a grating hinged on the bottom of said plant receptacle for supporting the plants so as to permit the pickers to pick them up, a rotatable hinge pin for raising and lowering said grating upon said pickers, a sleeve fixed to said receptacle, and a screw having right and left threads operatively connected with said shaft and engaging said sleeve to reciprocate said receptacle so that each portion of said receptacle may pass successively over said plant-setting means.

In testimony whereof I affix my signature.
LUIGI MARANGONI.